UNITED STATES PATENT OFFICE.

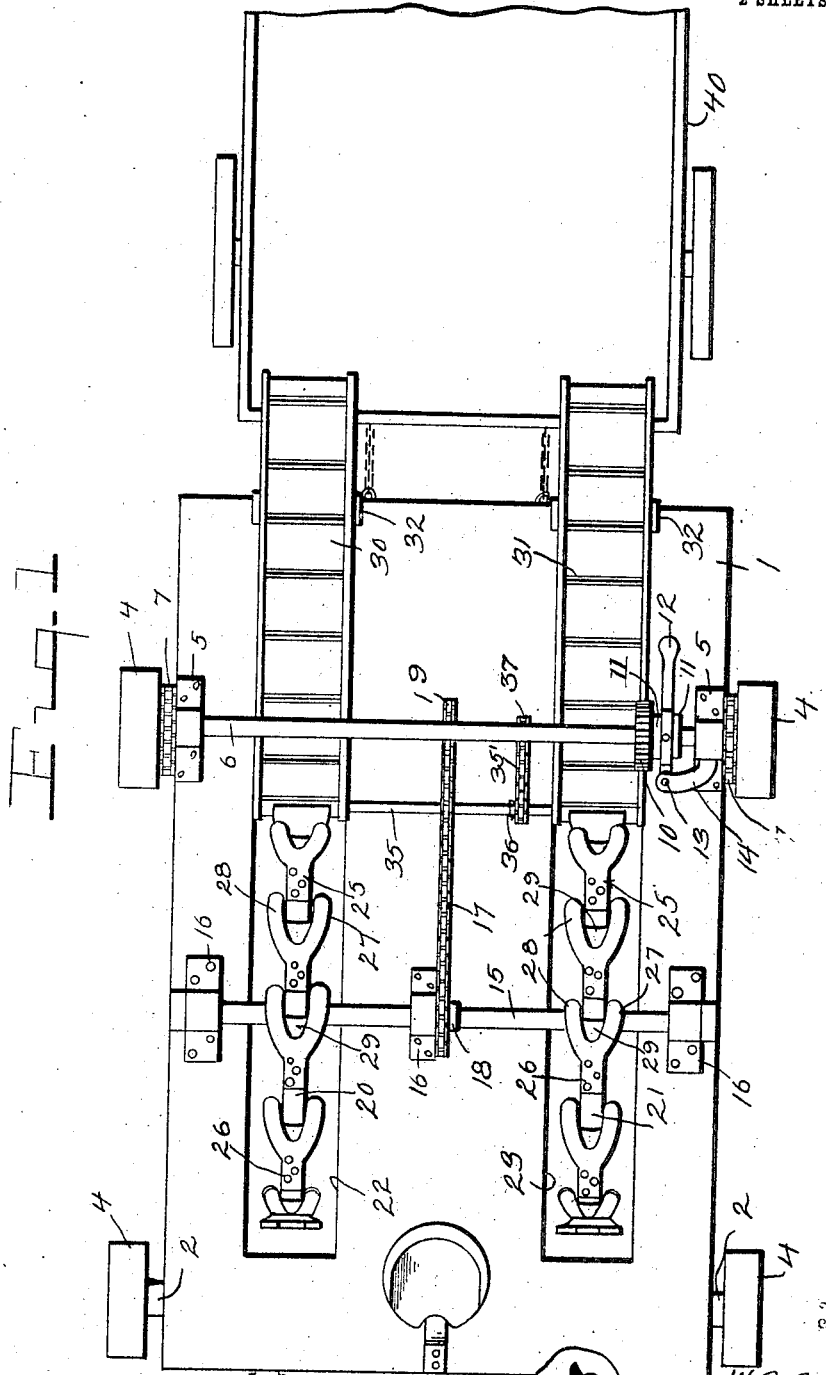

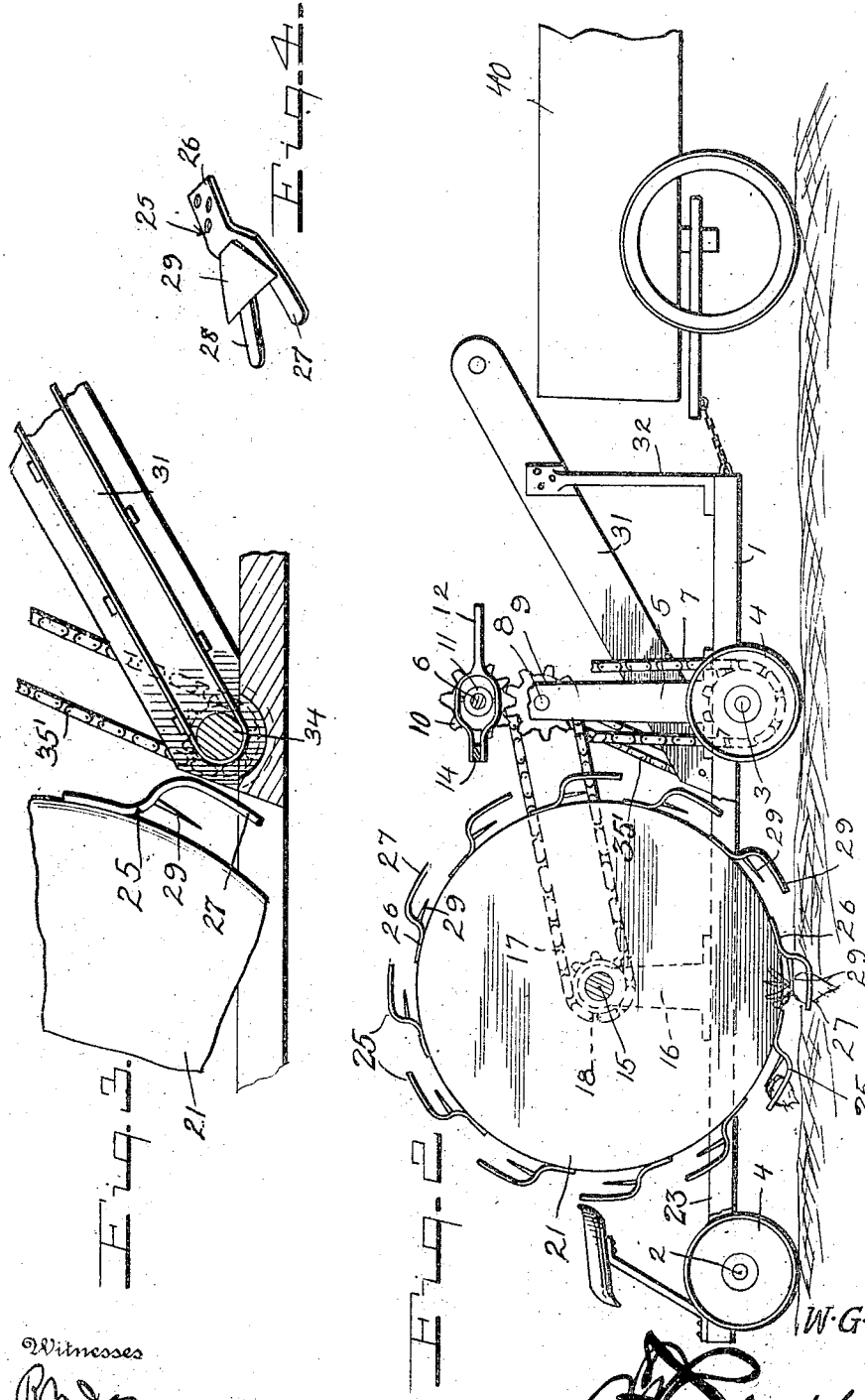

WILLIAM G. ACKERMAN, OF WESTPOINT, NEBRASKA.

BEET-HARVESTER.

1,136,858.   Specification of Letters Patent.   Patented Apr. 20, 1915.

Application filed November 30, 1914. Serial No. 874,840.

*To all whom it may concern:*

Be it known that I, WILLIAM G. ACKERMAN, a citizen of the United States, residing at Westpoint, in the county of Cuming and State of Nebraska, have invented certain new and useful Improvements in Beet-Harvesters; and I do hereby declare the following to be a full, clear, and exact description of the invention, such as will enable others skilled in the art to which it appertains to make and use the same.

This invention relates to beet harvesters and the primary object of the invention is to provide a mechanism for topping and uprooting the beets and depositing them in a suitable type of wagon or other container.

Another object of this invention is to provide, in a beet harvester construction, a pair of rotatable drums which have a plurality of forked members secured to the periphery thereof for engaging the beets and uprooting the same and elevating them for deposit upon a suitable conveyer.

Another object of this invention is to attach to the uprooting bracket members cutting blades for severing the tops from the beets during the uprooting thereof.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved beet harvester. Fig. 2 is a longitudinal sectional view through the beet harvester. Fig. 3 is an enlarged fragmentary sectional view of the beet harvester, and Fig. 4 is a detail perspective view of one of the uprooting and topping members.

Referring more particularly to the drawings, 1 designates the supporting platform of the beet harvester which has rotatably suspended therebeneath front and rear axles 2 and 3 upon which are mounted traction wheels 4. The platform 1 has supported by brackets 5 which are secured to the upper surface thereof and extend upwardly therefrom, a shaft 6 which extends transversely across the frame and is operatively connected to the rear axles 3 by suitable sprockets and sprocket chains 7. The supporting brackets 5 have a second shaft 8 rotatably journaled therein and positioned directly beneath and in alinement with the shaft 6. The shaft 8 is rotated by the shaft 6 through the meshing of gears 9 and 10. The gear 10 is mounted upon a sleeve 11 which is feathered upon the shaft 6. The sleeve 11 has a shifting lever 12 connected thereto which is pivotally connected at 13 to a bracket arm 14 which is formed upon the bracket 5 and upon oscillatory movement of the lever the gear 10 may be moved longitudinally upon the shaft for moving it into or out of meshing engagement with the gear 9 for causing the shaft 8 to rotate by the rotation of the shaft 6.

The shaft 8 is operatively connected to a shaft 15, which is positioned forwardly thereof and is rotatably supported by suitable journaling brackets 16 which are secured to the upper surface of the platform 1. The shaft 15 is operatively connected to the shaft 8 by a sprocket chain 17 which passes about sprockets 18 and 19, which are mounted upon the shafts 15 and 6 respectively.

The shaft 15 has drums 20 and 21 mounted thereupon for synchronous rotation with the shaft. The drums 20 and 21 extend through openings 22 and 23 respectively which are formed in the supporting platform 1, so that the peripheries of the drums will engage the surface of the ground over which the beet harvester is traveling. The drums 20 and 21 have a plurality of forked beet pulling members 25 secured to the peripheries thereof, and circumferentially spaced thereabout. The forked members 25 have their connected portions 26 securely attached to the peripheries of the drums 20 and 21, and the forks 27 and 28 thereof are bent outwardly for spacing from the periphery of the drum, for insertion into the ground upon opposite sides of a beet for engaging the beet and uprooting the same upon rotation of the drum. The forked members 25 have cutting blades 29 secured thereto at a short distance rearwardly and upwardly from the point of conjunction of the arms 27 and 28, which cutting knife projects forwardly in a plane parallel with the arms 27 and 28 and is adapted for engaging the tops of the beets while the fork engages the beet body, and severing the top from the beet proper.

After the tops have been severed from the beets, the rotation of the drums 20 and 21 will elevate the beets, and carry them around, depositing them upon conveyers 30 and 31. The conveyers 30 and 31 are supported by the platform 1, and at an incline thereto by the brackets 32 which extend vertically from the upper surface of the platform as is clearly shown in Fig. 2 of the drawings. The lower end of the conveyers 30 and 31 is propelled by drums or rollers 34 which are mounted upon a shaft 35. The shaft 35 is journaled transversely of the supporting platform 1 and is operatively connected to the shaft 8 by a sprocket 35′, which sprocket passes about suitable sprocket wheels 36 and 37 which are mounted upon the shafts 35 and 8 respectively. The conveyers 30 and 31 extend rearwardly of the rear end of the harvester and are provided for depositing the beets into a wagon as indicated at 40 in the drawings, for conveyance to a suitable place of storage.

From the foregoing description taken in connection with the accompanying drawings the advantages of construction and of the method of operation of the improved beet harvester will be readily apparent to those skilled in the art to which this invention appertains and, while in the foregoing description the principle of the operation of the improved beet harvester has been described together with various features of construction, it is to be understood that certain minor features of construction combination and arrangement of parts may be altered to suit practical conditions provided such alterations are comprehended within the scope of what is claimed.

What is claimed is:—

1. In a beet harvester structure, a supporting platform, a drum rotatably carried by said platform, means for rotating said drum by the traction of the harvester structure, a plurality of forked members secured to the periphery of said drum and in spaced relation to each other, said forked members having their arms bent outwardly and spaced from the peripheries of said drum for engaging beets and uprooting them upon the rotation of said drum, cutting blades secured to said forked members for cutting the tops from the beets upon the uprooting thereof by said forks.

2. In a beet harvester structure, a supporting platform having a longitudinally extending opening formed therein, a drum rotatably carried by said platform and extending through said opening, a plurality of forked members secured to the periphery of said drum in spaced relation to each other, said forked members having their arms bent outwardly and spaced from the periphery of said drum, cutting blades secured to said forked members for cutting the tops from the beets, traction axles carried by said supporting structure, means for operatively connecting said drum to said traction axles for rotating said drums upon the rotation of said axle, and means for throwing said drum into or out of operative connection with said traction axle.

In testimony whereof I affix my signature in presence of two witnesses.

WILLIAM G. ACKERMAN.

Witnesses:
CHARLES BECKENHAUER,
A. L. KRAUSE.